United States Patent
Hall et al.

(10) Patent No.: US 8,195,914 B2
(45) Date of Patent: *Jun. 5, 2012

(54) MECHANISM FOR REMAPPING POST VIRTUAL MACHINE MEMORY PAGES

(75) Inventors: Clifford D. Hall, Orangevale, CA (US); Randolph L. Campbell, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/020,124

(22) Filed: Feb. 3, 2011

(65) Prior Publication Data

US 2011/0131363 A1    Jun. 2, 2011

Related U.S. Application Data

(63) Continuation of application No. 10/330,986, filed on Dec. 27, 2002, now Pat. No. 7,900,017.

(51) Int. Cl.
G06F 12/00 (2006.01)
G06F 13/00 (2006.01)
G06F 13/28 (2006.01)

(52) U.S. Cl. .......... 711/205; 711/E21.016; 711/E12.061

(58) Field of Classification Search .............. 711/6, 207, 711/205, E12.016, E12.061
See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen |
| 4,521,852 A | 6/1985 | Guttag |
| 4,571,672 A | 2/1986 | Hatada et al. |
| 4,621,318 A | 11/1986 | Maeda |
| 4,759,064 A | 7/1988 | Chaum |

(Continued)

FOREIGN PATENT DOCUMENTS

CN    1382277 A    11/2002

(Continued)

OTHER PUBLICATIONS

"The Authoritative Dictionary of IEEE Standards Terms", IEEE Computer Society 7 th Edition, Version 100, 2000.

(Continued)

*Primary Examiner* — Sheng-Jen Tsai

(74) *Attorney, Agent, or Firm* — Thomas R. Lane

(57) ABSTRACT

According to one embodiment, a computer system is disclosed. The computer system includes a processor, a chipset coupled to the processor and a memory coupled to the chipset. The chipset translates partitioned virtual machine memory addresses received from the processor to page level addresses.

5 Claims, 5 Drawing Sheets

U.S. PATENT DOCUMENTS

| | | |
|---|---|---|
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard et al. |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,139,760 A | 8/1992 | Ogawa et al. |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle et al. |
| 5,784,707 A | 7/1998 | Khalidi et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,809,551 A | 9/1998 | Blandy |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal et al. |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,956,756 A | 9/1999 | Khalidi et al. |
| 5,970,147 A | 10/1999 | Davis |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo et al. |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Insley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakamura |
| 6,260,095 B1 * | 7/2001 | Goodrum .................. 710/310 |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams et al. |
| 6,374,286 B1 | 4/2002 | Gee et al. |
| 6,374,317 B1 | 4/2002 | Ajanovic et al. |
| 6,378,068 B1 | 4/2002 | Foster et al. |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough |

| | | | |
|---|---|---|---|
| 6,463,535 B1 | 10/2002 | Drews | |
| 6,463,537 B1 | 10/2002 | Tello | |
| 6,499,123 B1 | 12/2002 | McFarland et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,683,615 B1* | 1/2004 | Baldwin | 345/543 |
| 6,684,326 B1 | 1/2004 | Cromer et al. | |
| 6,772,315 B1 | 8/2004 | Perego | |
| 6,772,316 B2* | 8/2004 | Lyon | 711/207 |
| 6,856,320 B1 | 2/2005 | Rubinstein et al. | |
| 7,089,377 B1* | 8/2006 | Chen | 711/147 |
| 2001/0021969 A1 | 9/2001 | Burger et al. | |
| 2001/0027511 A1 | 10/2001 | Wakabayashi et al. | |
| 2001/0027527 A1 | 10/2001 | Khidekel et al. | |
| 2001/0037450 A1 | 11/2001 | Metlitski et al. | |
| 2002/0007456 A1 | 1/2002 | Peinado et al. | |
| 2002/0023032 A1 | 2/2002 | Pearson et al. | |
| 2002/0147916 A1 | 10/2002 | Strongin et al. | |
| 2002/0152428 A1 | 10/2002 | James et al. | |
| 2002/0166061 A1 | 11/2002 | Falik et al. | |
| 2002/0169717 A1 | 11/2002 | Challener | |
| 2002/0184399 A1 | 12/2002 | Bak et al. | |
| 2003/0074548 A1 | 4/2003 | Cromer et al. | |
| 2003/0115453 A1 | 6/2003 | Grawrock | |
| 2003/0126442 A1 | 7/2003 | Glew et al. | |
| 2003/0126453 A1 | 7/2003 | Glew et al. | |
| 2003/0131178 A1 | 7/2003 | Huang et al. | |
| 2003/0159056 A1 | 8/2003 | Cromer et al. | |
| 2003/0172234 A1 | 9/2003 | Soltis, Jr. | |
| 2003/0188179 A1 | 10/2003 | Challener et al. | |
| 2003/0196085 A1 | 10/2003 | Lampson et al. | |
| 2004/0088505 A1 | 5/2004 | Watanabe | |
| 2004/0098544 A1 | 5/2004 | Gaither et al. | |
| 2004/0117539 A1 | 6/2004 | Bennett et al. | |

FOREIGN PATENT DOCUMENTS

| | | |
|---|---|---|
| DE | 4217444 A1 | 12/1992 |
| EP | 0473913 A2 | 3/1992 |
| EP | 0600112 A1 | 6/1994 |
| EP | 0892521 A2 | 1/1999 |
| EP | 0930567 A2 | 7/1999 |
| EP | 0961193 A2 | 12/1999 |
| EP | 0965902 A2 | 12/1999 |
| EP | 1030237 A1 | 8/2000 |
| EP | 1055989 A1 | 11/2000 |
| EP | 1056014 A1 | 11/2000 |
| EP | 1085396 A1 | 3/2001 |
| EP | 1146715 A1 | 10/2001 |
| EP | 1271277 A2 | 1/2003 |
| JP | 2000076139 A | 3/2000 |
| WO | 95/24696 A2 | 9/1995 |
| WO | 97/29567 A1 | 8/1997 |
| WO | 98/12620 A1 | 3/1998 |
| WO | 98/34365 A1 | 8/1998 |
| WO | 98/44402 A1 | 10/1998 |
| WO | 99/05600 A2 | 2/1999 |
| WO | 99/09482 A1 | 2/1999 |
| WO | 99/18511 A1 | 4/1999 |
| WO | 99/57863 A1 | 11/1999 |
| WO | 99/65579 A1 | 12/1999 |
| WO | 00/21238 A1 | 4/2000 |
| WO | 00/62232 A1 | 10/2000 |
| WO | 01/27723 A1 | 4/2001 |
| WO | 01/27821 A1 | 4/2001 |
| WO | 01/63994 A2 | 8/2001 |
| WO | 01/75564 A2 | 10/2001 |
| WO | 01/75565 A2 | 10/2001 |
| WO | 01/75595 A2 | 10/2001 |
| WO | 02/01794 A2 | 1/2002 |
| WO | 02/17555 A2 | 2/2002 |
| WO | 02/060121 A1 | 8/2002 |
| WO | 02/086684 A2 | 10/2002 |
| WO | 03/058412 A2 | 7/2003 |

OTHER PUBLICATIONS

"Trusted Computing Platform Alliance", Main Specification Version 1.1a, Dec. 2001.
Gum, "System/370 Extended Architecture: Facilities for Virtual Machines", IBM J. Research and Development, vol. 27, No. 6, Nov. 1983, pp. 530-544.
"Hot Chips 11: Conference Record", Aug. 15-17, 1999, pp. 180-196.
Goldberg, "Survey of Virtual Machine Research", Computer Operating Systems, Honeywell Information Systems and Harvard University, Jun. 1974, vol. 7, No. 6, pp. 34-45.
Gong et al., USENIX: "Going Beyond the Sandbox: An Overview of the New Security Architecture in the Java Development Kit 1.2", Dec. 1997, 11 pages.
Berg, "How Do I Create a Signed Applet?", Dr. Dobb's Journal, Aug. 1997, pp. 1-9.
"Intel386 DX Microprocessor 32-Bit CHMOS Microprocessor with Integrated Memory Management", Dec. 1995, pp. 1-56.
"M68040 User's Manual", Motorola Inc., 1990, 457 pages.
Heinrich, "MIPS R4000 Microprocessor User's Manual", Second Edition, 1994, 754 pages.
Brands, "Restrictive Blinding of Secret-Key Certificates", Springer-Verlag XP002201306, (1995),Chapter 3.
Chien et al., "Safe and Protected Execution for the Morph/AMRM Reconfigurable Processor," 7th Annual IEEE Symposium, FCCM '99 Proceedings, Apr. 21, 1999, pp. 209-221.
Davida et al., "Defending Systems Against Viruses through Cryptographic Authentication", Proceedings of the Symposium on Security and Privacy, IEEE Computer Society, May 1989, pp. 312-318.
"Information Display Technique for a Terminate Stay Resident Program," IBM, Technical Disclosure Bulletin, TDB-ACC-No. NA9112156, vol. 34, Issue No. 7A, Dec. 1, 1991, pp. 156-158.
Intel, "IA-32 Intel Architecture Software Developer's Manual Citation", vol. 3, System Programming Guide Miscellaneous Information, 2003, pp. 13-1 to 13-24.
Karger et al., "A VMM Security Kernel for the VAX Architecture", Proceedings of the Symposium on Research in Security and Privacy, May 7, 1990, pp. 2-19.
Kashiwagi et al., "Design and Implementation of Dynamically Reconstructing System Software", Proceedings on Software Engineering Conference, Dec. 4-7, 1996, pp. 278-287.
Lawton et al., "Running Multiple Operating Systems Concurrently on an IA32 PC Using Virtualization Techniques", retrieved on Nov. 29, 1999, pp. 1-31, Webpage available at: http://www.ece.cmu.edu/~ece845/sp05/docs/plex86.txt.
Luke et al., "Replacement Strategy for Aging Avionics Computers", IEEE Aerospace and Electronic Systems Magazine, Mar. 1999, pp. 7-11.
Menezes et al., "Handbook of Applied Cryptography", CRC Press LLC, 1997, pp. 475.
Richt et al., "In-Circuit-Emulator Wird Echtzeittauglich", Elektronic, Franzis Verlag GMBH, Munchen, DE, vol. 40, No. 16, Aug. 6, 1991, pp. 100-103.
Robin et al., "Analysis of the Pentium's Ability to Support a Secure Virtual Machine Monitor," Proceedings of the 9th USENIX Security Symposium, Aug. 14, 2000, pp. 1-17.
Saez et al., "A Hardware Scheduler for Complex Real-Time Systems", Proceedings of the IEEE International Symposium on Industrial Electronics, Jul. 1999, pp. 43-48.
Sherwood et al., "Patchable Instruction ROM Architecture", Department of Computer Science and Engineering, Nov. 2001, 10 pages.
"IA-64 System Abstraction Layer Specification", Intel Corporation, Intel Product Specification, Order No. 245359-001, Jan. 2000, 112 pages.
"Intel IA-64 Architecture Software Developer's Manual—vol. 2: IA-64 System Architecture", Intel Corporation, Intel Product Manual, Order No. 245318-001, Jan. 2000, pp. i, ii, 5.1-5.3, 11.1-11.8, 11.23-11.26.

Coulouris et al., "Distributed Systems: Concepts and Design", 2nd Edition, Addison-Wesley Publishers Ltd., 1994, pp. 422-424.

Crawford, "Architecture of the Intel 80386", Proceedings of the IEEE International Conference on Computer Design: VLSI in Computers (ICCD '86), Oct. 6-9, 1986, pp. 155-160.

Fabry, "Capability-Based Addressing", Communications of the ACM, vol. 17, No. 7, Jul. 1974, pp. 403-412.

Frieder, "The Architecture and Operational Characteristics of the VMX Host Machine", IEEE Proceedings of the 15th Annual Workshop on Microprogramming, Oct. 5, 1982, pp. 9-16.

"Mobile Security Overview", Hewlett Packard Company, Sep. 2002, pp. 1-9.

"IBM ThinkPad T30 Notebooks", IBM Corporation, IBM Product Specification, Jul. 2, 2002, pp. 1-6.

Intel Corporation, "Intel 82802AB/82802AC Firmware Hub (FWH)", Intel Product Datasheet, Document No. 290658-004, Nov. 2000, pp. 1-6 and 17-28.

Menezes et al., "Handbook of Applied Cryptography", CRC Press Series on Discrete Mathematics and its Applications, Oct. 1996, pp. 403-405, 475, 506-515, 570.

Nanba et al., "VM/4: ACOS-4 Virtual Machine Architecture", IEEE Proceedings of the 12th Annual Symposium on Computer Architecture, Jun. 1985, pp. 171-178.

RSA Security Inc., "Hardware Authenticators", 2004, pp. 1-2, Webpage available at: http://www.rsa.com/node.aspx?id=1158.

RSA Security Inc., "Software Authenticators", 2004, pp. 1-2, Webpage available at: http://www.rsa.com/node.aspx?id=1313.

RSA Security Inc., "RSA SecurID Authenticators", 2003, pp. 1-2.

Schneier, "Applied Cryptography: Protocols, Algorithm, and Source Code in C", 2nd Edition, Wiley, John & Sons, Inc., (Hardcover Printing) Oct. 1995, pp. 47-52, 56-65, 169-187.

Schneier, "Applied Cryptography: Protocols, Algorithm, and Source Code in C", 2nd Edition, Wiley, John & Sons, Inc., (Softcover Printing) Nov. 1995, pp. 28-33, 176-177, 216-217, 461-473, 518-522.

Office Action received for Chinese Patent Application No. 200310123566.5, mailed on Jan. 7, 2005, 9 pages of English Translation.

* cited by examiner

MECHANISM FOR REMAPPING POST VIRTUAL MACHINE MEMORY PAGES"}

MECHANISM FOR REMAPPING POST VIRTUAL MACHINE MEMORY PAGES

CROSS-REFERENCE TO RELATED APPLICATIONS

This application is a continuation of prior U.S. patent application Ser. No. 10/330,986 filed Dec. 27, 2002 now U.S. Pat. No. 7,900,017.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates to virtual machines of a computer processor such as a microprocessor. In particular, the invention relates to memory management for virtual machines.

BACKGROUND

An Operating System (OS) is a software program that controls physical computer hardware (e.g., a processor, memory, and disk and CD-ROM drives) and presents application programs with a unified set of abstract services (e.g., a file system). A Virtual Machine Manager (VMM) is also a software program that controls physical computer hardware such as, for example, the processor, memory, and disk drives. Unlike an OS, a VMM presents programs executing within a Virtual Machine (VM) with the illusion that they are executing on real physical computer hardware that includes, for example, a processor, memory and a disk drive.

Each VM typically functions as a self-contained entity, such that software executing in a VM executes as if it were running alone on a "bare" machine instead of within a virtual machine that shares a processor and other physical hardware with other VMs. It is the VMM that emulates certain functions of a "bare" machine so that software executing within a VM executes as if it were the sole entity executing on the computer.

Various techniques have been developed to assign physical system memory to virtual machines running on a system. One such technique is the use of partitioned memory. Partitioned memory is where physical system memory is divided into a number of contiguous regions. While partitioned memory is less expensive to implement in the CPU, memory cannot be easily reconfigured dynamically between virtual machines.

Also various techniques have been developed to obtain greater performance from a given memory capacity. One such technique is the use of virtual memory. Virtual memory is based on the concept that, when running a program, the entire program need not be loaded into main memory at one time. Instead, the computer's operating system loads sections of the program into main memory from a secondary storage device (e.g., a hard disk drive) as needed for execution.

To make this scheme viable, the operating system maintains tables, which keep track of where each section of the program resides in main memory and secondary storage. As a result of executing a program in this way, the program's logical addresses no longer correspond to physical addresses in main memory. To handle this situation a central processing unit (CPU) maps the program's effective or virtual addresses into their corresponding physical addresses.

However, in computer systems implementing the partitioned memory technique, it is often desirable to dynamically reallocate memory for each virtual machine. It is also desirable manage memory on an individual page basis, rather than in large regions. With current partitioned memory systems, it is not possible to dynamically reallocate memory. Current partitioned memory systems also impose many limitations on the page level flexibility that many operating systems require to support virtual memory.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A mechanism for remapping partitioned virtual machine memory to page granular memory is described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
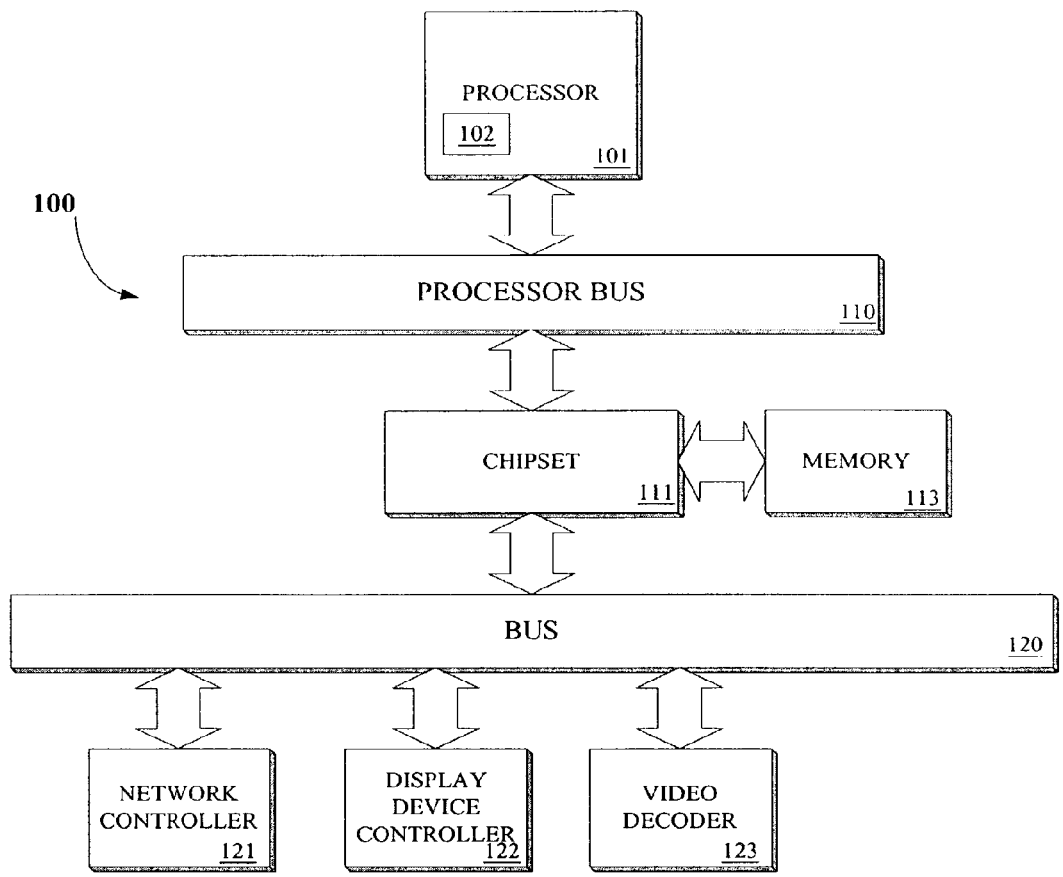
FIG. 1 is a block diagram of one embodiment of a computer system.

FIG. 1 is a block diagram of one embodiment of a computer system 100. The computer system 100 includes a processor 101 that processes data signals. Processor 101 may be a complex instruction set computer (CISC) microprocessor, a reduced instruction set computing (RISC) microprocessor, a very long instruction word (VLIW) microprocessor, a processor implementing a combination of instruction sets, or other processor device.

In one embodiment, processor 101 is a processor in the Pentium® family of processors including the Pentium® IV family and mobile Pentium® and Pentium® IV processors available from Intel Corporation of Santa Clara, Calif. Alternatively, other processors may be used. FIG. 1 shows an example of a computer system 100 employing a single processor computer. However, one of ordinary skill in the art will appreciate that computer system 100 may be implemented using multiple processors.

Processor 101 is coupled to a processor bus 110. Processor bus 110 transmits data signals between processor 101 and other components in computer system 100. Computer system 100 also includes a memory 113. In one embodiment, memory 113 is a dynamic random access memory (DRAM) device. However, in other embodiments, memory 113 may be a static random access memory (SRAM) device, or other memory device.

Memory 113 may store instructions and code represented by data signals that may be executed by processor 101. According to one embodiment, a cache memory 102 resides within processor 101 and stores data signals that are also stored in memory 113. Cache 102 speeds up memory accesses by processor 101 by taking advantage of its locality of access. In another embodiment, cache 102 resides external to processor 101.

Computer system 100 further comprises a chipset 111 coupled to processor bus 110 and memory 113. Chipset 111 directs data signals between processor 101, memory 113, and other components in computer system 100 and bridges the data signals between processor bus 110, memory 113, and a first input/output (I/O) bus 120.

In one embodiment, I/O bus 120 may be a single bus or a combination of multiple buses. In a further embodiment, I/O bus 120 may be a Peripheral Component Interconnect adhering to a Specification Revision 2.1 bus developed by the PCI Special Interest Group of Portland, Oreg. In another embodiment, I/O bus 120 may be a Personal Computer Memory Card International Association (PCMCIA) bus developed by the PCMCIA of San Jose, Calif. Alternatively, other busses may be used to implement I/O bus. I/O bus 120 provides communication links between components in computer system 100.

A network controller 121 is coupled I/O bus 120. Network controller 121 links computer system 100 to a network of computers (not shown in FIG. 1) and supports communication among the machines. In one embodiment, computer system 100 receives streaming video data from a computer 110 via network controller 121.

A display device controller 122 is also coupled to I/O bus 120. Display device controller 122 allows coupling of a display device to computer system 100, and acts as an interface between the display device and computer system 100. In one embodiment, display device controller 122 is a monochrome display adapter (MDA) card.

In other embodiments, display device controller 122 may be a color graphics adapter (CGA) card, an enhanced graphics adapter (EGA) card, an extended graphics array (XGA) card or other display device controller. The display device may be a television set, a computer monitor, a flat panel display or other display device. The display device receives data signals from processor 101 through display device controller 122 and displays the information and data signals to the user of computer system 100.

A video decoder 123 is also coupled to I/O bus 120. Video decoder 123 is a hardware device that translates received encoded data into its original format. According to one embodiment, video decoder 123 is a Moving Picture Expert Group 4 (MPEG-4) decoder. However, one of ordinary skill in the art will appreciate that video decoder 123 may be implemented with other types of MPEG decoders.

Figure 2:
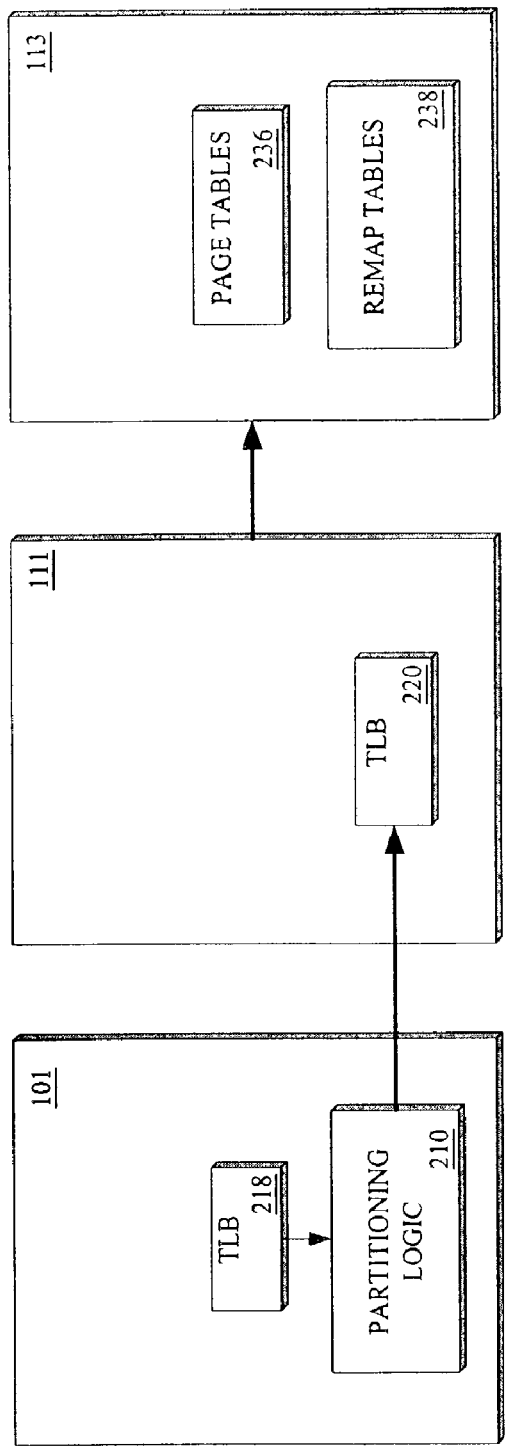
FIG. 2 is a block diagram of one embodiment of a processor coupled to a chipset and memory device.

According to one embodiment, computer system 100 supports virtual machines using partitioned memory. In a further embodiment, computer system 100 includes a mechanism to re-map post virtual machine memory to page granular memory. FIG. 2 is a block diagram of one embodiment of processor 101 coupled to chipset 111 and memory device 113. Processor 101 includes partitioning logic 210 and translation lookaside buffer (TLB) 218.

Partitioning logic 210 supports virtual machine systems by the partitioning of addresses in memory 113. Partitioning logic 210 stores mapping information that indicates the location of pages in memory 113 at TLB 218. In particular, partitioning logic 210 generates a range of addresses for each virtual machine. For example, a 0-1 Gb range may be allocated for a first virtual machine, while 1-2 Gb, and 2-3 Gb ranges are allocated to a second and third virtual machines, respectively.

TLB 218 is coupled to partitioning logic 210. TLB 218 is a cache of the most frequently used page table entries (PTEs) in memory 113. In particular, TLB 218 includes the current active addresses being used in memory 113. Consequently, it is not necessary to access PTEs in memory 113 each time an address translation is performed.

In conventional virtual machine systems, partitioning logic 210 and TLB 218 perform all of the necessary address translations. However, it is often desirable to manage memory 113 on an individual page basis, rather than in large regions. With current partitioned memory systems, it is not possible to specify memory with page level flexibility that most operating systems require.

Chipset 111 includes a TLB 220. TLB 220 is a cache that includes the current active addresses being used at a remap table within memory 113. Memory 113 includes page tables 236 and remap tables 238. Page tables 236 translate the partitioned virtual machine addresses into physical memory addresses. Page tables 236 includes a collection of PTEs. Page tables 236 hold one PTE for each mapped virtual page. To access a page in physical memory, the appropriate PTE is looked up to find where the page resides.

Similar to page tables 236, remap tables 238 include a list of table entries that specify the remapping of partitioned virtual addresses to page level addresses. In one embodiment, TLB 220 and remap tables 238 are implemented to translate memory addresses back to supporting page level operation, thus, circumventing the range partitioning imposed by processor 101.

Figure 5:
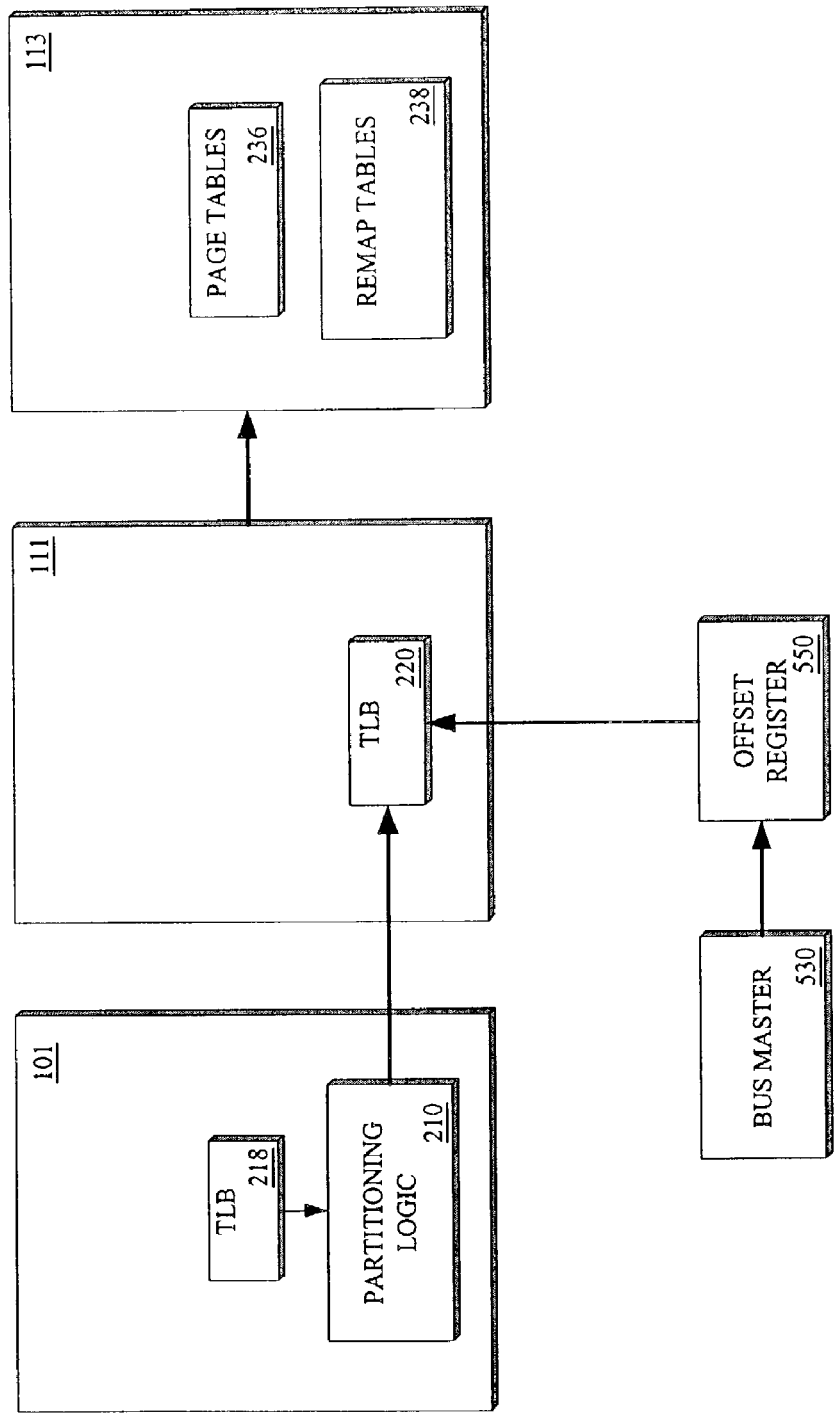
FIG. 5 is a block diagram of one embodiment of a bus master coupled to a chipset and memory device.

FIG. 5 is a block diagram of another embodiment of processor 101 and a bus master 530 coupled to chipset 111 and memory device 113. Bus master 530 is an I/O device (e.g., disk controller, graphics controller, etc.) that has access to memory 113. An offset register 550 is coupled between bus master 530 and TLB 220.

Offset register 550 provides mapping to an address space of a virtual machine that controls bus master 530. Typically, the computer system 100 operating system expects that the partitioned virtual machine physical address is the actual address. However, since the address is not the true physical address, because of the chipset remapping, the address used by bus master is not correct. Thus, offset manager 550 and TLB 220 correct the address so that the address is translated the same as the addresses of the operating system running in a VM are. According to one embodiment, TLB 220 may block bus master 530 access to memory 113 based upon a flag bit within TLB 220 base address. This flag can prevent read or write access or both depending on the definition provided by a particular implementation.

Figure 3:
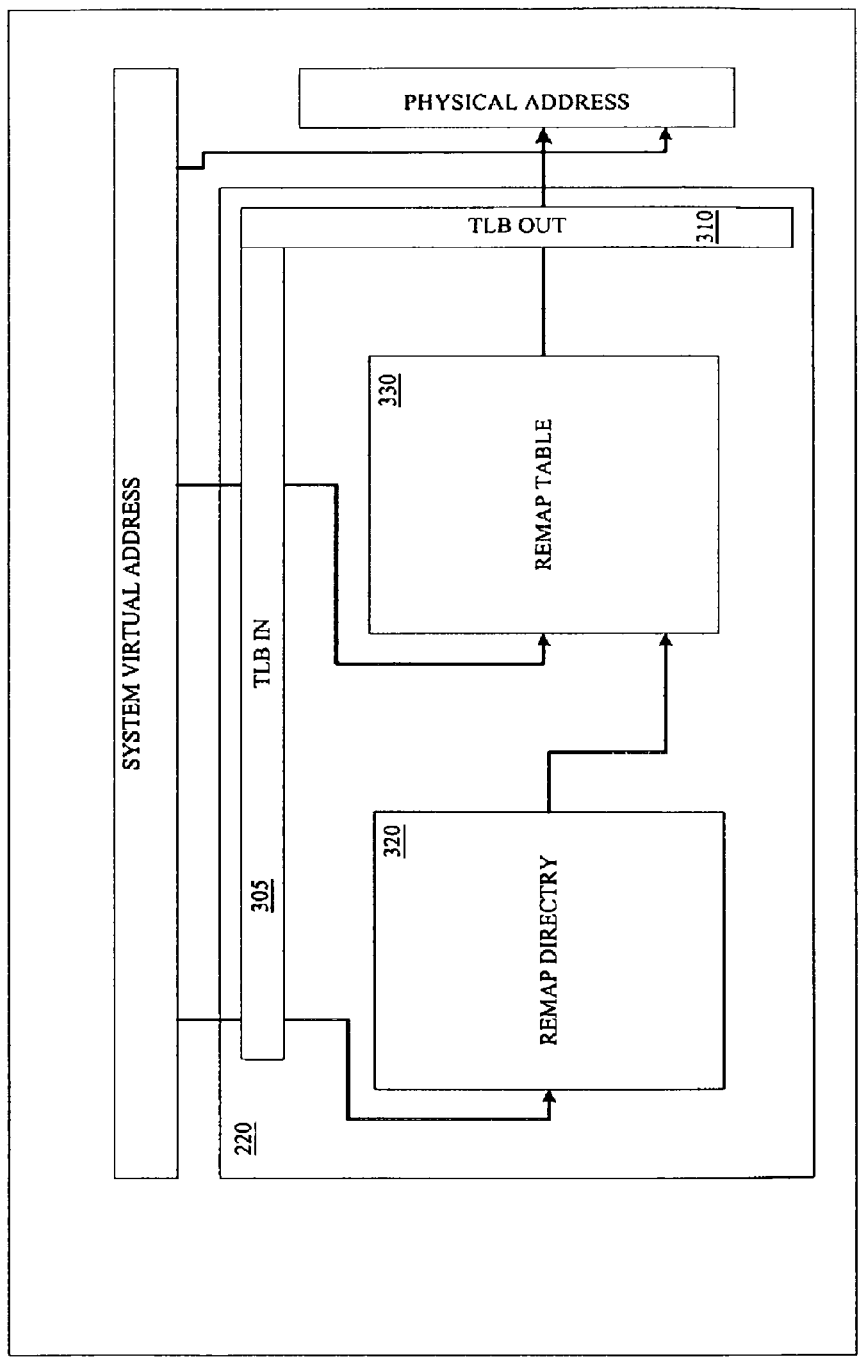
FIG. 3 is a block diagram for one embodiment of a chipset remapping mechanism.

FIG. 3 is a block diagram for one embodiment of a chipset 111. As discussed above, chipset 111 includes TLB 220. TLB 220 includes TLB input 305, TLB output 310, remap directory 320, and remap table 330. TLB input 305 receives a partitioned addresses from partitioning logic 210 within processor 101. TLB output 310 transmits the translated physical address to memory 113.

Directory entry 320 receives the bottom 10 bits of the partitioned address in order to define a starting location at remap table 330. Remap table 330 receives the next 10 bits that indicate an actual table entry within table 330 that includes the corresponding physical address. After the physical address is selected, the address is transmitted from TLB out 310 along with the first 12 bits of the partitioned address.

Figure 4:
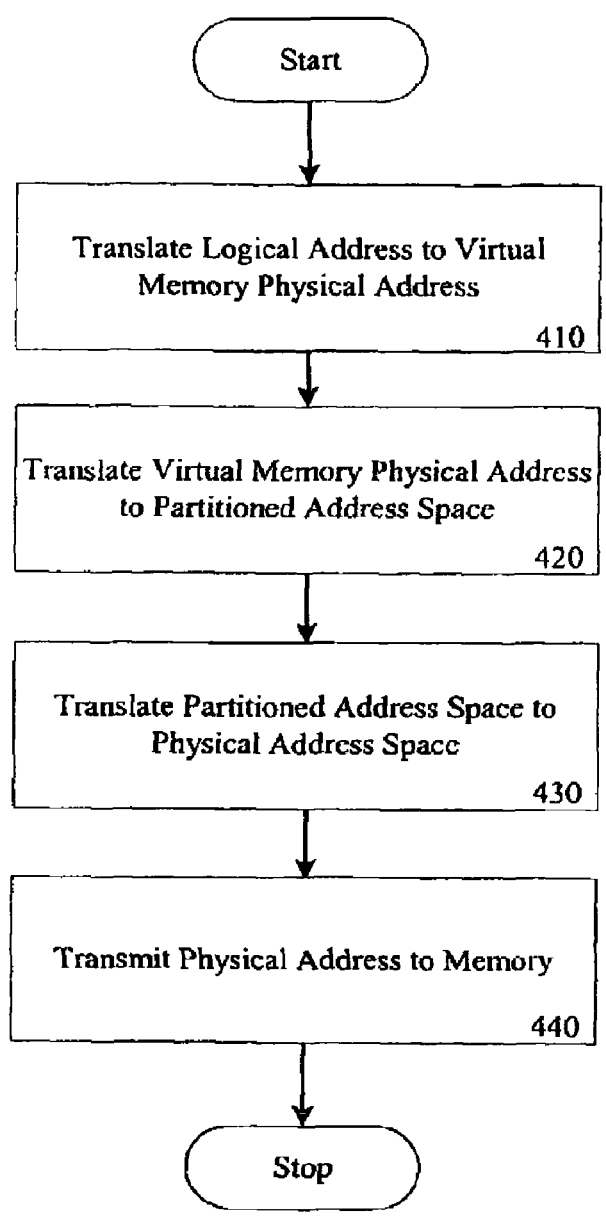
FIG. 4 is a flow diagram of one embodiment of converting a virtual address to a page address.

FIG. 4 is a flow diagram of one embodiment of converting a virtual address to a page address. At processing block 410, the processor 101 page tables (e.g., TLB 218) translates a logical address to a virtual memory physical address. At processing block 420, partitioning logic 210 translates the virtual memory physical address to partitioned address space. At processing block 430, the chipset remapping mechanism translates the partitioned address space to the physical address space. At processing block 440, the physical address is transmitted to memory 113.

The chipset remapping mechanism combines memory partitioning with the advantages of page granular remapping. Thus, the chipset remapping mechanism enables processors that support virtual machines with partitioned memory space to take advantage of the flexibility provided by a page granular memory space. For instance, dynamic resizing of memory for virtual machines, which is nearly impossible in conventional systems, may now be achieved Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A processor comprising:
   partitioning logic to partition a memory by dividing the memory into a plurality of contiguous regions and allocating each one of the plurality of contiguous regions to each one of a plurality of virtual machines, the memory to store a plurality of page tables and a plurality of remap tables;
   a first translation lookaside buffer to cache page table entries from the plurality of page tables; and
   a memory controller including a second translation lookaside buffer to cache remap table entries from the plurality of remap tables, the second translation lookaside buffer and the plurality of remap tables to circumvent the partitioning by remapping memory addresses from the processor and an input/output device at page level granularity, where page size is less than region size.

2. The processor of claim 1 wherein the second translation lookaside buffer and the plurality of remap tables are to circumvent the partitioning by translating partitioned memory addresses to physical memory addresses.

3. The processor of claim 2 wherein the second translation lookaside buffer comprises:
   an input that receives a partitioned memory address;
   a remap directory coupled to the input;
   a remap table coupled to the directory and the input; and
   an output, coupled to the remap table, that transmits a physical memory address.

4. The processor of claim 2 further comprising:
   an offset register coupled to the input/output device and the second translation lookaside buffer.

5. The processor of claim 4 wherein the second translation lookaside buffer controls the input/output device's permission to access the memory.

* * * * *